US008526985B2

(12) United States Patent
Cilli et al.

(10) Patent No.: US 8,526,985 B2
(45) Date of Patent: Sep. 3, 2013

(54) SYSTEM AND METHOD OF GEO-CONCENTRATED VIDEO DETECTION

(75) Inventors: Bruce R. Cilli, Atlantic Highlands, NJ (US); Charles Payette, Oceanport, NJ (US); Narayan Raman, Eatontown, NJ (US)

(73) Assignee: Alcatel Lucent, Paris (FR)

( * ) Notice: Subject to any disclaimer, the term of this patent is extended or adjusted under 35 U.S.C. 154(b) by 283 days.

(21) Appl. No.: 12/640,385

(22) Filed: Dec. 17, 2009

(65) Prior Publication Data

US 2011/0130087 A1     Jun. 2, 2011

Related U.S. Application Data

(60) Provisional application No. 61/265,356, filed on Nov. 30, 2009, provisional application No. 61/265,043, filed on Nov. 30, 2009, provisional application No. 61/265,111, filed on Nov. 30, 2009, provisional application No. 61/265,121, filed on Nov. 30, 2009.

(51) Int. Cl.
*H04B 7/00* (2006.01)

(52) U.S. Cl.
USPC ............. 455/503; 455/3.02; 725/54; 709/231

(58) Field of Classification Search
USPC ................ 455/3.05, 3.06, 414.1–414.4, 3.02, 455/503; 370/506; 725/62, 87, 43–50, 52–54, 725/56, 59, 61; 709/231, 203, 219; 375/E7.003, E7.004, E7.01, E7.011–E7.025, 375/E7.272
See application file for complete search history.

(56) References Cited

U.S. PATENT DOCUMENTS

| 5,644,577 | A  | * | 7/1997  | Christensen et al. | 370/506  |
|-----------|----|---|---------|--------------------|----------|
| 5,914,941 | A  | * | 6/1999  | Janky              | 370/313  |
| 6,084,629 | A  | * | 7/2000  | Schmutz et al.     | 348/97   |
| 6,963,565 | B1 | * | 11/2005 | Krishna et al.     | 370/392  |
| 7,020,490 | B2 | * | 3/2006  | Khatri             | 455/561  |
| 7,339,520 | B2 | * | 3/2008  | Chang et al.       | 342/359  |
| 7,421,136 | B2 | * | 9/2008  | Sirohey et al.     | 382/240  |
| 7,502,419 | B2 | * | 3/2009  | Kim et al.         | 375/267  |
| 7,509,687 | B2 | * | 3/2009  | Ofek et al.        | 726/30   |
| 7,656,842 | B2 | * | 2/2010  | Thomas et al.      | 370/334  |
| 7,808,905 | B2 | * | 10/2010 | Ibaraki et al.     | 370/235  |
| 7,936,759 | B2 | * | 5/2011  | Kritayakirana et al.| 370/394 |
| 7,936,790 | B2 | * | 5/2011  | Schmidt et al.     | 370/503  |
| 8,260,877 | B2 | * | 9/2012  | Biderman et al.    | 709/217  |
| 2004/0037235 | A1 | * | 2/2004 | Kadous            | 370/253  |
| 2004/0073437 | A1 | * | 4/2004 | Halgas et al.     | 705/1    |
| 2005/0202814 | A1 | * | 9/2005 | Bossemeyer et al. | 455/432.2|
| 2006/0067277 | A1 | * | 3/2006 | Thomas et al.     | 370/334  |

(Continued)

*Primary Examiner* — Dominic E Rego
(74) *Attorney, Agent, or Firm* — D. M. La Bruno (57) ABSTRACT

An application server in a communication network receives a plurality of data streams from a plurality of mobile stations that include a client for the application server. The data streams may be video, audio or a combination thereof and include an indicator of originating location of the data stream. A subset of the plurality of data streams that originates from an area are determined. The first set may also be determined based on a tag that is included in each of the data streams of the first set, the tag indicating a sharing status for a respective data stream and/or a subject of the respective data stream. A first data stream of the first subset transmitted to a service subscriber having an interest preference corresponding to the tag of first set data streams. The transmitted first data stream may include overlay content associated with the service provider.

19 Claims, 3 Drawing Sheets

(56) References Cited

U.S. PATENT DOCUMENTS

| | | | |
|---|---|---|---|
| 2006/0206561 A1* | 9/2006 | Chen et al. | 709/203 |
| 2007/0050592 A1* | 3/2007 | Gschwind et al. | 711/201 |
| 2007/0239562 A1* | 10/2007 | Lawson | 705/26 |
| 2007/0297359 A1* | 12/2007 | Li | 370/328 |
| 2008/0108302 A1* | 5/2008 | Linnamaki et al. | 455/3.06 |
| 2008/0186935 A1* | 8/2008 | Ling et al. | 370/342 |
| 2008/0291860 A1* | 11/2008 | Vijayan et al. | 370/312 |
| 2008/0318606 A1* | 12/2008 | Tsutsui et al. | 455/500 |
| 2009/0161742 A1* | 6/2009 | Ivory et al. | 375/225 |
| 2009/0164654 A1* | 6/2009 | Krstulich | 709/231 |
| 2009/0217320 A1* | 8/2009 | Aldrey | 725/37 |
| 2009/0228462 A1* | 9/2009 | Frieder et al. | 707/3 |
| 2009/0254572 A1* | 10/2009 | Redlich et al. | 707/10 |
| 2009/0269081 A1* | 10/2009 | Cai et al. | 398/202 |
| 2009/0313517 A1* | 12/2009 | Schedelbeck et al. | 714/748 |
| 2010/0036965 A1* | 2/2010 | Kim et al. | 709/231 |
| 2010/0146055 A1* | 6/2010 | Hannuksela | 709/206 |
| 2010/0172358 A1* | 7/2010 | Zuberi et al. | 370/395.41 |
| 2010/0265865 A9* | 10/2010 | Vijayan et al. | 370/312 |
| 2010/0306346 A1* | 12/2010 | Anderson et al. | 709/220 |
| 2011/0016204 A1* | 1/2011 | Wiener et al. | 709/224 |
| 2011/0055641 A1* | 3/2011 | Westby et al. | 714/57 |
| 2011/0246445 A1* | 10/2011 | Mishra et al. | 707/713 |

* cited by examiner

SYSTEM AND METHOD OF GEO-CONCENTRATED VIDEO DETECTION

This application claims priority to Provisional Application No. 61/265,356, filed Nov. 30, 2009, Provisional Application No. 61/265,043, filed Nov. 30, 2009, Provisional Application No. 61/265,111, filed Nov. 30, 2009, and Provisional Application No. 61/265,121, filed Nov. 30, 2009, the entirety of which is hereby incorporated by reference.

BACKGROUND

1. Field of the Invention

The invention relates to the delivery of data streams to mobile devices.

2. Statement of the Problem

Until recently, users of mobile devices predominantly uploaded considerably less data than they would download. However, the recent introduction of video-enabled mobile devices is likely to stimulate rapidly growing demand for uplink bandwidth as users increasingly stream data to friends. User-streaming of real-time, live video is also expected to contribute to the rapidly growing demand for uplink bandwidth.

When there is breaking news local, national and international news organizations are keen to obtain exclusive video footage of the event and be the first to inform the public of the news event. Since it is cost prohibitive for news organizations to have professional resources deployed to every location so as to be on location for the initiation of breaking news, often times, after becoming aware of a news event, news organizations will make on-air requests for anyone who has pictures or videos of the news event to contact the news organization.

In addition, if there is an emergency situation, first responders are often times not fully apprised of the circumstances and conditions at the location of the emergency situation. For emergency services, a user calls an emergency number (e.g., 911) to report the occurrence of an emergency event. Based on the emergency call, an emergency dispatcher is able is coordinate an appropriate response to the location of the emergency. However, first responders would be better informed if they were able to see what is happening before arriving on the scene of an emergency situation.

There are known methods that facilitate the streaming of video over a wireless link from a mobile device. However, conventional approaches apply limited intelligence to problems such as the identification of news events and the gathering and distribution of video associated with news events.

For news gathering, new organizations typically acquire video footage of the occurrence of an event depending upon the technology available by which the news event was originally captured and such acquisition is well after the fact. For example, a news organization may obtain video for distribution via copies of a video tape, a ftp file transfer, a stream from YouTube and the like some time after the content is created. Some news organizations also have portals that allow individuals to submit videos of a news event; the news organization can then choose to feature a particular video from the submitted videos. However, the news organization must review each of the submitted videos to determine whether any are truly newsworthy (i.e., worthwhile for further distribution and/or follow-up coverage, possibly by a professional reporter).

None of these above options available to news organizations provides video footage as the event occurs happens. Real-time video footage is typically not provided until a professional reporter is dispatched and arrives at the location of the news event some time later with the necessary equipment, which the reporter, after verifying the validity of the event, uses to transmit video coverage of the news event.

In certain instances, a reporter may, by happenstance, be at the location of a news event and be able to stream video over a wireless link from a mobile device to their employer. The validity and newsworthiness of the event is not questionable in this instance due to the trusted, professional relationship between the new organization and employee-reporter. However, for a variety of reasons (cost, time, manpower, etc.), more often that not, professional reporters will not be present at the origination of a newsworthy event. As a result, news organizations are not able to efficiently and effectively present coverage of news events as those events begin and develop.

SUMMARY

The recent introduction of video-enabled mobile devices increases the likelihood that an individual is at the location of a news event and using his/her mobile device to record the event and/or stream the event to a friend contemporaneously with beginning of the event or shortly thereafter. Conventional approaches to streaming data from a mobile device, in general, do not identify the content (e.g., what individual or group, what type of event) that is being provided to a receiver of the data stream (e.g., a potential viewer or interested user of the video).

Provided is a new approach by which intelligence can be gathered from the network, including from mobile devices on the network, so that the occurrence of a newsworthy event can automatically decided, and a data stream concerning the newsworthy event be provided to subscribers of the relevant service. For example, a user who is transmitting the video will know the characteristics of the video (e.g., who is being videoed, what event is being videoed), will be able to "tag" the video stream as such, and may wish to widely disseminate the video to interested users of this type of video.

Likewise, a news organization or service provider may wish to gather intelligence including data streams from "amateur" reporters, distill a newsworthy event from the gathered intelligence, and transmit a data stream from one of the "amateur" reporters to subscribers interested in particular types of data streams.

In one embodiment, a method comprises receiving a plurality of data streams; determining a first subset of the plurality of data streams, the first subset originating from an area; and transmitting a first data stream of the first subset. The plurality of data streams are received at an application server in a communication network from a plurality of mobile stations in a communication network. The mobile stations include an application server client. The data streams may be video data streams, audio data streams or a combination thereof.

The first subset may be determined based on a received signal strength of the data stream, a received signal direction of the data stream, GPS coordinates of the data stream, and a communication cell associated with the data stream. In one embodiment, the area is an area within a geo-fence, a geographic zone, an area within range of a first eNodeB, an area within a range of a location, or a communication cell.

In one embodiment, the first set may also be determined based on a tag that is included in each of the data streams of the first set. The tag is a value of an indicator field included in a respective data steam. For example, the tag may indicate a sharing status for a respective data stream, a subject of a respective data stream, a significance of a respective data stream, a type of event associated with a respective data stream, a person of interest associated with a respective data stream or a combination thereof. For instance, the tag may indicate whether the respective data stream is associated with an emergency situation, a political event, an entertainment event, a sports event, a musician, a politician, a sports player, a sports team, a policeman, and the like, or a combination thereof.

A first data stream of the first subset is transmitted to at least one subscriber of a service. In another embodiment, the first data stream is transmitted to at least one subscriber of a service, the at least one subscriber having an interest preference corresponding to the tag associated with the data streams of the first set. Transmitting the first data stream may include determining the subscriber having an interest in the first data stream. In one embodiment, the subscriber to whom the first data stream is transmitted is based on geographic location of the subscriber with respect to the area from which the first data stream originated. The first data stream of the first subset that is transmitted may also include overlay content associated with a service provider. For example, form a plurality of data stream related to a plane crash, one stream may be provided to news subscribers. Selection of the one stream to be provided to an individual subscriber may also depend on the quality of the one data stream and the subscriber's mobile station's capabilities.

In another embodiment, an apparatus comprises a storage system configured to store data stream information, and a control system configured to access data stream information from the storage system, the control system configured to receive information concerning a plurality of data streams, to determine a first subset of the plurality of data streams, the first subset originating from an area, and to transmit a first data stream of the first subset. The apparatus may be an application server.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used herein the description, the term "and" is used in both the conjunctive and disjunctive sense and includes any and all combinations of one or more of the associated listed items.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
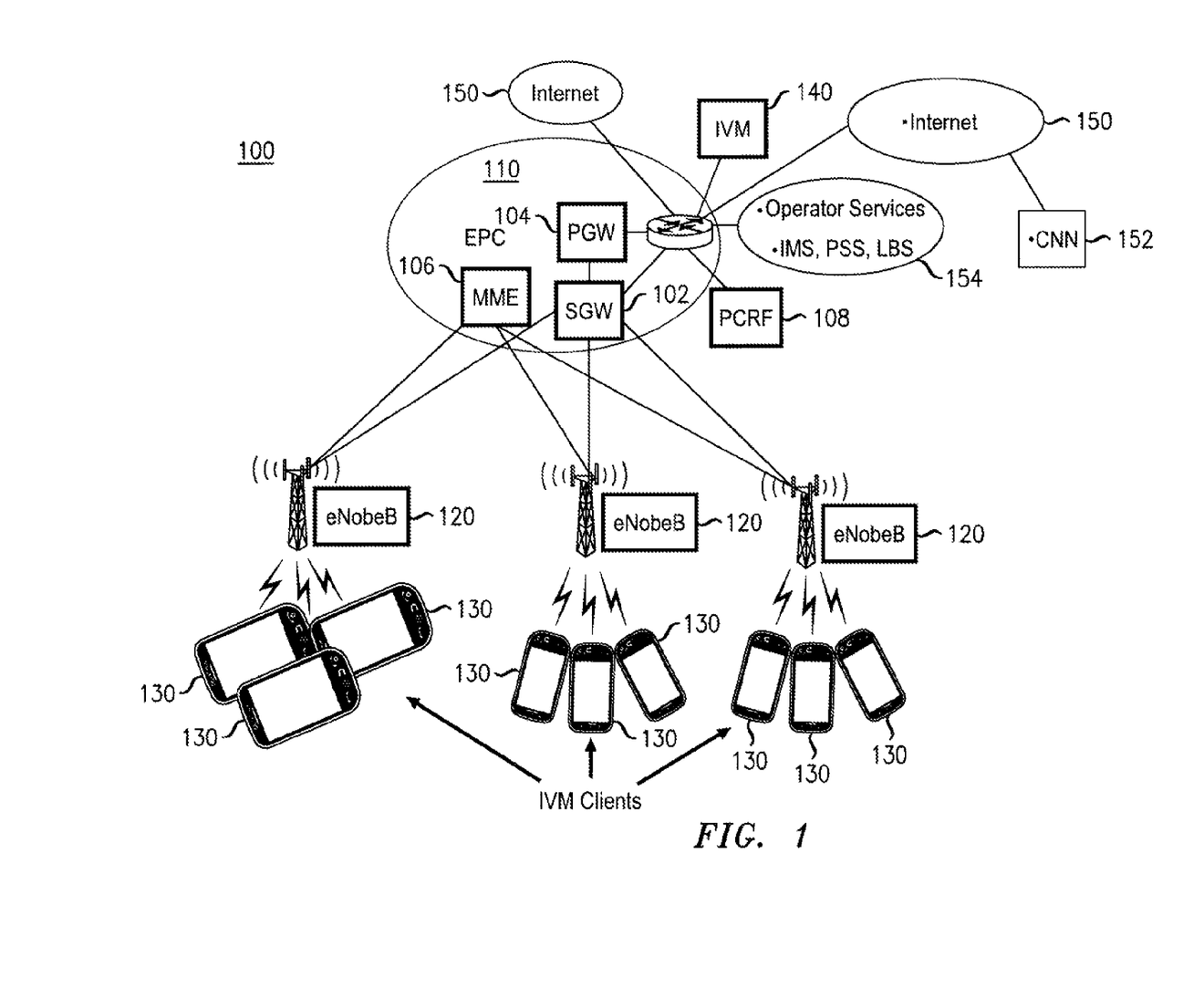
FIG. 1 illustrates a network in an exemplary embodiment.

FIG. 1 illustrates a network in an exemplary embodiment. One example of a network that can support the provided methods of video transmission is provided by Long Term Evolution (LTE), a Fourth Generation enhancement to Universal Mobile Telecommunications System (UMTS) telecommunication that includes an all-IP networking architecture. LTE is being introduced through a series of releases by the 3rd Generation Partnership Project (3GPP). In LTE, the General Packet Radio Service (GPRS) core network is replaced by the System Architecture Evolution (SAE), which is a flat, IP-based network architecture. Because LTE is all-IP from end to end, mobile handsets and other terminal devices for LTE have embedded IP capabilities, and the base stations, referred to as Evolved NodeBs (eNodeBs) are IP-based. Those skilled in the art will understand that the principles of the present invention may be implemented in any suitably arranged telecommunications network.

The network 100 of FIG. 1 illustrates the Evolved Packet Core (EPC) 110, which is the main architectural component of SAE. It will be seen from the figure that the EPC comprises four elements: the Serving Gateway (SGW) 102, the Packet Data Network Gateway (PGW) 104, the Mobility Management Entity (MME) 106, and the Policy and Charging Rules Function (PCRF) 108. The SCW, PGW, and MME were introduced in 3GPP Release 8, and the PCRF was introduced in 3GPP Release 7.

The SGW 102 is a data plane element. Its primary function is to manage user-plane mobility and to act as a demarcation point between the radio access network (RAN) and the core networks. The SGW maintains data paths between eNodeBs 120 and the PGW. eNodeBs 120 communicate with User Equipment (UEs) 130 over the air interface. UEs may be any suitable wireless devices or mobile station, including conventional cellular radiotelephones, PCS handset devices, personal digital assistants, portable computers, and the like, which are capable of communicating with the eNodeBs via wireless links.

The PGW 104 is the termination point of the packet data interface toward the packet data networks. As such, it is the entry and exit point for traffic for the User Equipment (UEs) 130, i.e., for the user terminals. The PGW supports operator-defined policy for resource allocation and usage, packet filtering, and charging.

The MME 106 performs the signaling and control functions to manage the UE access to network connections, the assignment of network resources, and the management of the mobility states to support tracking, paging, roaming, and handovers, as well as all other control-plane functions related to subscriber and session management.

The PCRF 108 supports service data flow detection, policy enforcement, and flow-based charging. (In LTE, a service data flow (SDF) is the virtual connection that carries data-plane traffic.) The PCRF may also be situated just outside the EPC, where it can intercommunicate with various EPC elements.

With further reference to FIG. 1, it will be seen that a network element, called an Intelligent Video Masher (IVM) is situated, for example, just outside the EPC, where it can intercommunicate with the various EPC elements. More particularly, the IVM communicates using known protocols of the Internet protocol suite. Higher protocol layers are used for the signaling and messaging that set up the video streaming. The IVM may reside on any of various hardware platforms, such as an ATCA platform. In one embodiment, the IVM may be incorporated into a node of the EPC such as the PGW. The IVM is provided to detect events and create composite events as will be described further herein.

Communication between the IVM and the various user terminals is effectuated by a protocol layer added on top of LTE. Toward that end, UEs 130 include IVM clients for communication with the IVM. The required protocol layer is readily added using known protocols, and need not be described here in detail.

The IVM acquires network intelligence gathered from clients running on the various network nodes, including user terminals and elements of the EPC, using known protocols. In particular, information about bandwidth availability may be acquired through negotiation between the IVM and the PCRF. For example, the IVM may request a certain amount of bandwidth from the PCRF, and if the request is denied, the IVM may make second and further, stepped-down requests until a bandwidth grant is made. The IVM may make this request indirectly via another network element of the EPC. Likewise, the IVM may acquire information about the applicable Service Level Agreement (SLA) from the user profile, which is typically stored in an AAA server (not shown), which may be accessed via the PCRF. Additional protocol layers are used for the signaling and messaging that can be used to set up video streaming. Such communication may be accomplished using known protocols of the Internet protocol suite 154 provided by the network operator such as IP Multimedia Subsystem (IMS), Packet Switched Stream (PSS), Location Based Service (LBS), and other packet based protocols, provided by the Operator of the EPC. The IVM may reside on any of various hardware platforms, such as an ATCA platform.

With further reference to FIG. 1, it will be seen that the EPC 110 is able to intercommunicate with and over the Internet 150. For example, an internet server 150 for a news interested organization (e.g., News Networks such as a broadcast, satellite or cable TV network, an Emergency Service Department such as a Fire Department, Ambulance Service, and the like (illustrated in FIG. 1 as CNN)) can intercommunicate with the various EPC elements over the Internet via the IVM.

Figure 2:
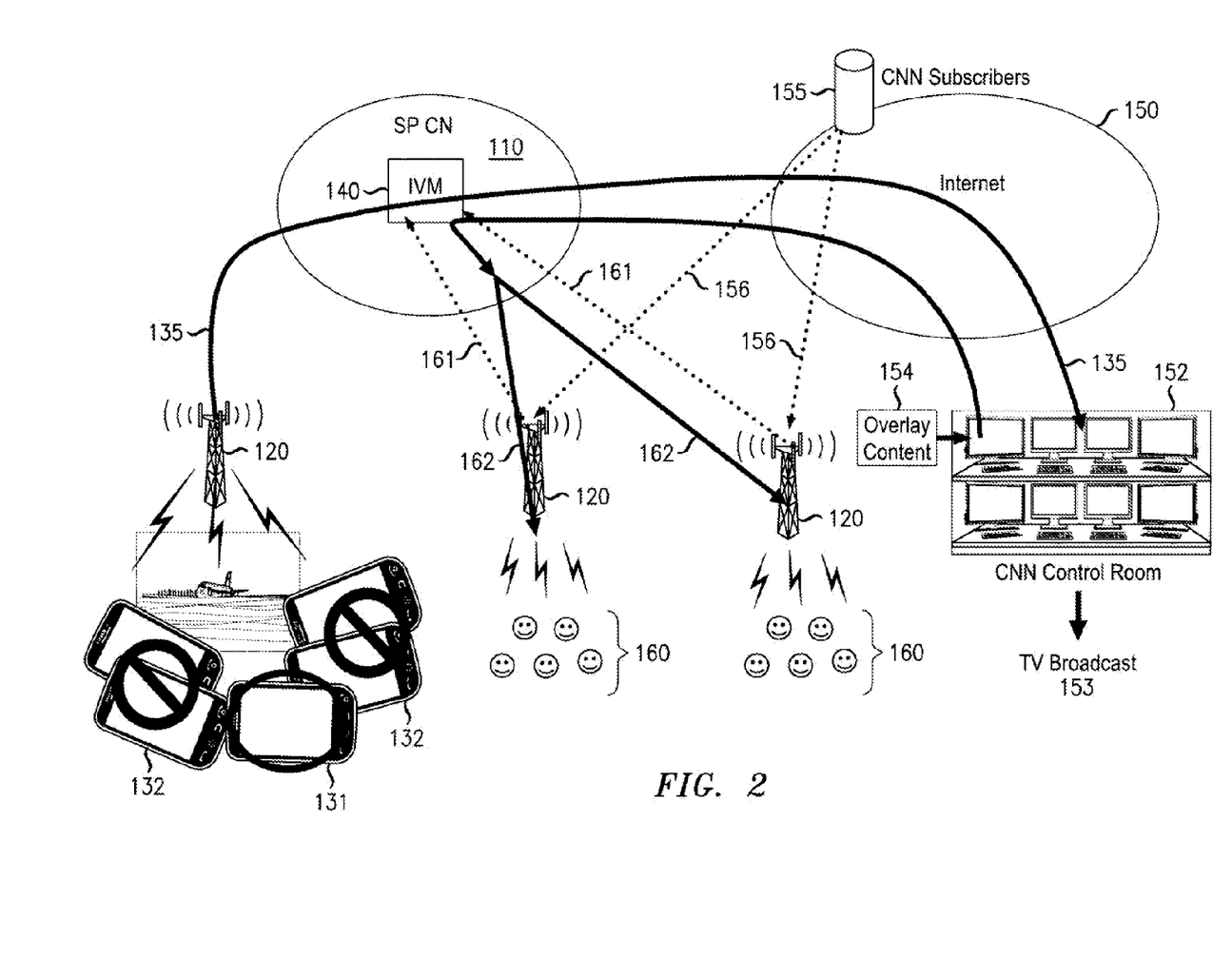
FIG. 2 illustrates a network with handling of data streams in an exemplary embodiment according to the principles of the invention.

FIG. 2 illustrates a network with handling of data streams in an exemplary embodiment according to the principles of the invention. The illustrated embodiment enables users to make their video available in real time to interested parties. The population of individuals owning devices equipped with the capability to stream video over 3G and 4G wireless networks will begin to increase dramatically such that stream video will be common place. Embodiments of the provided Intelligent Video Masher (IVM) enable CrowdReporting of an event to mobile stations/subscribers having an expressed interest in events concerning a particular subject matter.

For example, when a user of a mobile device 131 encounters a newsworthy event, s/he may choose to shoot and stream a video of the event and tag the video stream as publicly available. By tagging the data steam as publicly available, the user indicates that the data stream may be shared with others. Other additional tags may also be used to describe this event, e.g., emergency situation, political event, entertainment, etc. These additional tags further detail the content of the data stream the user is providing. The tag is a value of an indicator field included in a respective data steam. For example, the tag may indicate a subject of a respective data stream, a significance of a respective data stream, a type of event associated with a respective data stream, a person of interest associated with a respective data stream or a combination thereof. Exemplary tags include those that indicate the respective data stream is associated with an emergency situation, a political event, an entertainment event, a sports event, a musician, a politician, a sports player, a sports team, a policeman, and the like, or a combination thereof. Subscribers such as media outlets 152, public safety 160, individuals 160 or any enterprise 160 can choose to be alerted to such events.

A network element (referred to herein as an Intelligent Video Masher (IVM)) is provided to detect these events and create composite events. For example, a number (e.g., ten (10)) of "news event" tagged videos may be being streamed within a (e.g., two-hundred (200) meter) radius, or a single feed may be streamed for 911 emergency call. Interested parties may be alerted to the event and can then view the video feeds and determine if there is any value to the video feeds. For instance, a news organization 152 (e.g., CNN) may decide to broadcast a particular video feed live 153. The news organization may further create overlay content to be provided with a data stream provided to other subscribers through the IVM. Audio feeds or a combination of video and audio feeds can be handled in similar fashion.

The IVM may be configurable with a default operating procedure and as well enable enterprises to make dynamic requests. An exemplary default procedure may be to always alert public feeds tagged as news from a specific network user (e.g., user A) because that network user has a track record of being on the scene of breaking news events. Another default procedure may be to alert service subscribers when a threshold number of feeds tagged as news are received from an area of a designated size (e.g., when ten video feeds are received from within a quarter mile of each other). A further default procedure may be to alert subscribers when a threshold number of feeds tagged as news are received from an area of a designated size and the feeds include at least one feed from an individual with a threshold level of prior history with the service. A dynamic request may be to stream any public feed from within a geo-fence because it has been determined that news is breaking in that area (e.g., natural disaster). The quality of the data stream provided by the feed may also be utilized to determine whether a streamed event is newsworthy. For instance, if the quality of data streams is not satisfactory for re-broadcast or streaming to subscribers, it may determined that a non-newsworthy event is occurring. Naturally, the IVM query a subscriber database 155 to determine the appropriate subscribers for any particular newsworthy event.

When the network element is integrated into the operator's environment it may also be enabled to grant higher priority to video streams, possibly at the expense of other video feeds. So, for example, a subscribing enterprise, such as a new organization (e.g., CNN) can direct the IVM to provide an increase in the bandwidth allocation to a video stream that is provided to a subset of subscribers associated with the news organization thereby allowing the sending and receiving of higher quality video. Note that the capabilities of the devices actually shooting the video stream will also contribute to the selection of the video feed to be provided to subscribers of the service.

As an example, suppose a group of people are at an event honoring an individual for community service. At some time during the event, a surprise guest arrives (e.g., national celebrity, politician, local sports star, etc.). In response and as a result of the occurrence of this event, people with video capable wireless devices 131, 132 start streaming "public" video to their friend/s (e.g., according to a contact list). In other words, video marked with a "public" tag begins being streamed. The IVM 140 will detect a significant concentration of public video streams within a (e.g., small) area demarked by a geo-fence and alert subscribers to the service (e.g. Monmouth County News and its subscribers). The local online news service (Monmouth County News) may view a number of video feeds. All of the video feeds are similar so the IVM chooses the feed from the device that can stream at the highest quality—user A mobile device 131. This choice is communicated to the IVM which in turn requests additional bandwidth for user A. The network operator accommodates this choice according to its policies, adjusting bandwidth allocation as needed. Monmouth County News alerts it's subscribers to breaking news and makes user A's video available to its subscribers. Alternatively, the IVM may determine that a newsworthy event is occurring without providing the number of video feeds to the local online news service (Monmouth County News) and provide automatically a selected one of the number video feeds to subscribers of the local online news service 160 (i.e., subscribers of Monmouth County News). The selection of an appropriate one of the video feeds to make available to any individual subscriber may be based on gatherable intelligence. In one embodiment, the data stream that is transmitted to subscribers is the "best" quality of video that can be streamed and ultimately viewed over a wireless link to the individual subscriber The gatherable intelligence may be any information useful in the processing to make the abovesaid decision. Examples include:
   device capabilities of the viewers, such as screen size, that limit the quality of video (such as QVGA as opposed to SVGA) that can be viewed; and
   network conditions such as the bandwidth that can be maintained to stream the video over the uplink, the bandwidth that the target viewers can maintain for viewing the video, and the bandwidth that can be maintained through the backhaul and core network. The gatherable intelligence may also include adjustments based on whether the Mobile Content Generator (MCG) of the data stream is stationary or moving.

The gatherable intelligence may also include location information for members of a contact list or followers list. Such information may be used in conjunction with the aforesaid list to define a geofence, for example. By "geofence" is meant a geographic boundary that is logically defined using a location-based service, so that when a suitably responsive device enters or leaves the area, it generates a notification. Thus, for example, a geofence may be defined as containing all points within five miles of the MCG's location, and may be used to enforce a policy that video may be sent only to subscribers that are within the five-mile range.

Further information may be used to enforce policies that may, for example, further limit the set of approved recipients for a video transmission. For example, user profiles or lists of user interests may be included. On the basis of such a set of profiles or interests, for example, a video may be sent only to subscribers who satisfy the criterion that they be located within a five-mile radius as well as a criterion that they be interested in the subject of the video.

The abovesaid intelligence is gathered and maintained by an application server in the network, referred to here as the Intelligent Video Masher (IVM). An IVM client resides on the MCG device. The MCG device is typically, although not necessarily, a mobile device. It may be any communication device that can process and stream video and can connect to a wireless network, for example a smartphone, laptop, netbook, or camera.

In this manner, news/media enterprises can be alerted to and subsequently broadcast exclusive breaking news before their competitors. Depending on the event, the news/media enterprises may or may not choose to send professional reporters allowing more efficient use of their professional resources. In a similar manner, first responders can be alerted to emergencies and be much more prepared for the situation once they arrive based on en-route viewing of the feed from a MCG at the emergency.

As opposed to existing news gathering during or following a significant story, which often consists of public requests for any videos, eyewitness accounts, pictures, etc., the methodology of the invention provides "crowd reporting", such that amateurs routinely report on events.

Referring again to an example scenario as illustrated in FIG. 2, multiple individuals view the occurrence of an event (e.g. a plane crash landing) capture video of this newsworthy event with MCGs 131, 132. A plurality of the individuals capturing video opt into the crowd reporting service.

These individuals start up the IVM client on their smartphones and enter their public streaming preference through the interface. The IVM 140 receives the data streams 135 from these individuals and first determines that the data streams (a subset of all data streams received by the IVM) are within the specified geofence. (To support the geofence, the IVM or a separate appliance may maintain a running list of contacts located within a default geofence.) The IVM then identifies that a significant news event is occurring since a threshold number of data streams is arriving from within an area (e.g., within 1 quarter mile of other, from within two hundred meters of location X, etc) and groups the data stream into a new set V1. Determination of the new set of data streams V1 may be additionally based on a subject matter tag associated with the data streams. Next, the IVM notifies subscribing news service 152 (e.g., CNN) of the event and provides the video feeds to the new service (see arrow 135). The news service verifies the newsworthiness of the event, and notifies the IVM that the news subscribers of the news service should be provided with a data stream of the newsworthy event. Alternatively, the IVM may determine that a newsworthy event is occurring based on the occurrence of a threshold number of video feeds associated with one or more tags and be triggered to notify subscribers (160, 152) having an interest in video of events so tagged based on a subscriber database maintained by the IVM. Accordingly, it may not be necessary for the news organization to provide the list of subscribers to the IVM in response to the determination of the occurrence of a newsworthy event. In that case, new service 152 is considered as another service subscriber.

Individual subscribers of the news network service 160 are notified and provided with an invitation to view the video (see arrow 156). Subscriber database 155 may be co-located with the IVM and be provisioned by subscribers, enterprises, news organizations and the like. The interested news subscribers of the news service can join the video feed by, for example, choosing a link to a URL, as displayed on their personal communication devices and be provided one of the data streams of the set V1 (e.g., the stream from MCG 131). Other methods of providing notification to news subscribers of the news organization are also possible and will be apparent to those skilled in the art.

The personal communication devices 160 transmit the "join" information back to the IVM together with information describing their own device capabilities (see arrow 161). The IVM may create a composite device capability profile from the set of information received from the personal communication devices. The composite device capability profile can then be used to determine an appropriate one of the data streams 131, 132 to provide to each subscriber. In FIG. 2, the data stream is provide to subscribers via arrow 162.

The IVM may also query the wireless network to determine what bandwidth a particular MCG (e.g., Individual A 131) can acquire for data stream upload, in view of Individual A's Service Level Agreement (SLA), current streaming and the current network conditions. The IVM then sends a message to Individual A's communication device (which may, e.g., be a smartphone) suggesting the quality of video that could be sent immediately. The available quality may be described, for example, in terms of parameters representing resolution, frames per second, screen size, and the like. The suggested quality of video may be of a greater level than that already being streamed according to Individual A's SLA (e.g., higher prioritization, greater frames per second, and the like). In this manner, a subscribing enterprise, such as a new organization can direct that an increase in the bandwidth allocation be provided to a subset of data stream providers 131, 132 streaming an event that the news organization is interested in thereby allowing the sending and receiving of higher quality video related to the event.

Individual A may be given a prompt to start video transmission for delivery to public subscribers (i.e., notification that his/her video is being streamed to the service subscribers). In some cases, the IVM may have already made a request and reservation for an end-to-end connection or for service flows to subscribers. In such cases, the video transmission may begin immediately to subscribers, and without notification to the Individual A whose video stream is chosen to be provided to subscribers.

In other cases, the subscriber's selection of the news prompt message will initiate a call set up, and the video transmission will begin after the call has been established. Video is streamed first to the IVM so it may cache the video stream for subscribing viewers who join after the live video has ended. The video is transmitted from the IVM to the viewers identified as the appropriate set of subscribers by whatever method is supported by the access system for video content delivery. Two possible methods are unicast and multicast. Overlay content 154 may be added to the data stream that is provided by the IVM to the a portion of the subscribers of the news service. For example, a news organization may add additional content to the video stream provided to subscribers so as to brand the video and provide context to the video.

Figure 3:
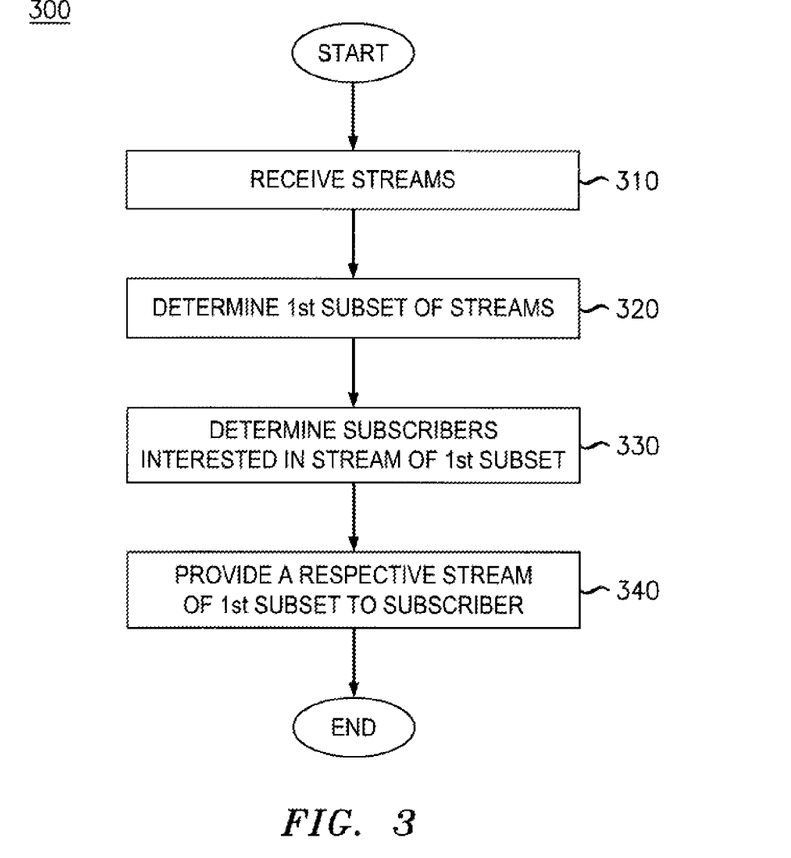
FIG. 3 is a flow chart illustrating one embodiment of a method for determining receiving data streams, determining a first subset of data streams and providing a respective stream of the first subset to a subscriber according to the principles of the invention.

FIG. 3 is a flow chart illustrating one embodiment of a method for determining receiving data streams, determining a first subset of data streams and providing a respective stream of the first subset to a subscriber according to the principles of the invention. The steps of method 300 will be described with reference to mobile network 100 in FIG. 1 and handling of data stream illustrated in FIG. 2, but those skilled in the art will appreciate that method 300 may be performed in other networks and systems. The steps of the flow charts described herein are not all inclusive and may include other steps not shown. The steps may also be performed in an alternative order.

In step 310, the IVM 140 receives data streams 135 from mobile devices 131, 132. In step 320, the IVM 140 determines a first subset of data streams that are associated with a newsworthy event. The IVM may determine the occurrence of a newsworthy event based on one or more characteristics of the newsworthy event such as the origination location of the data streams, whether streaming has indicate the data stream is to be shared or not, the subject matter of the data streams, the numerosity of data streams above a threshold number, gatherable intelligence related to the data streams and the like. Origination location of a data stream may be determined based on the received signal strength of a data stream, the received signal direction of a data stream, GPS coordinates of a data stream, association of a data stream with a communication cell and the like. The subject matter of the data streams may be determined based on a tag included in each of the data streams that indicate one or more of a sharing status for a respective data stream, a subject of a respective data stream, a significance of a respective data stream, a type of event associated with a respective data stream, a person of interest associated with a respective data stream or a combination thereof. In one embodiment, newsworthy event is determined be occurring when a number of data streams concerning a single subject are being streamed from within an area designated by a geo-fence.

In response to the determination that a newsworthy event is being streamed, in step 330 the IVM determines subscribers that are interested in the newsworthy event. Subscribers may be determined by querying a subscriber database 155. Subscriber database may include information regarding subscriber preferences (events that hold interest for the subscriber as detailed by corresponding tags) center 121 based on the failed delivery attempt.

In step 340, the IVM provides a data stream of the first subset of data streams to a subscriber having an interest in an event having the characteristics of the identified newsworthy event. For example, the IVM may stream a video feed (e.g., video feed from mobile content generator 131) relating to a place crash to a news organization subscriber 152 and other subscribers 160 associated with the news organization. Step 340 may include receiving overlay content from the one subscriber (e.g., the news organization) and aggregating the overlay content with the data stream being streamed to other subscribers 160.

A variety of the functions described above with respect to the exemplary method are readily carried out by special or general purpose digital information processing devices acting under appropriate instructions embodied, e.g., in software, firmware, hardware or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module. For example, functional modules of the DSP and the other logic circuits can be implemented as an ASIC (Application Specific Integrated Circuit) constructed with semiconductor technology and may also be implemented with FPGA (Field Programmable Gate Arrays) or any other hardware blocks.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

What is claimed is:

1. A method comprising:
   receiving a plurality of contemporaneous data streams from a plurality of mobile stations in a communication network, each respective contemporaneous data stream including a tag, the tag having a tag value indicating a subject of the respective contemporaneous data stream, a significance of the respective contemporaneous data stream, a type of event for the respective contemporaneous data stream, a person of interest associated with the respective contemporaneous data stream or a combination thereof;
   determining a first subset of the plurality of contemporaneous data streams, the first subset originating from an area determined based on an originating location of the respective contemporaneous data stream, coordinates of the respective contemporaneous data stream, or a communication cell associated with the respective contemporaneous data stream, the first subset of contemporaneous data streams having a same tag value; and
   transmitting a first data stream of the first subset.

2. The method of claim 1 wherein the plurality of contemporaneous data streams are received at an application server in a communication network.

3. The method of claim 1 the plurality of mobile stations include an application server client.

4. The method of claim 1 wherein the plurality of contemporaneous data streams are video data streams.

5. The method of claim 1 wherein the plurality of contemporaneous data streams are audio data streams.

6. The method of claim 1 wherein the plurality of contemporaneous data streams include at least one video data stream and at least one audio data stream.

7. The method of claim 1 wherein the plurality of contemporaneous data streams include an indicator of originating location of the data stream.

8. The method of claim 1 wherein the determining of the first subset is based on at least one of received signal strength of the respective data stream and received signal direction of the respective data stream.

9. The method of claim 1 wherein the area is an area within a geo-fence, a geographic zone, an area within range of a first eNodeB, an area within a range of a location, a communication cell, or an area of a designated size.

10. The method of claim 1 wherein the tag value is a value of an indicator field included in a respective data steam.

11. The method of claim 1 wherein the tag indicates a sharing status for a respective data stream.

12. The method of claim 1 wherein the tag indicates whether the respective data stream is associated with an emergency situation, a political event, an entertainment event, a sports event, a musician, a politician, a sports player or a combination thereof.

13. The method of claim 1 wherein transmitting the first data stream of the first subset comprises:
   transmitting the first data stream to at least one subscriber of a service, the at least one subscriber having an interest preference corresponding to the same tag value associated with the contemporaneous data streams of the first set.

14. The method of claim 1 wherein transmitting the first data stream of the first subset comprises:
   transmitting the first data stream to at least one subscriber of a service.

15. The method of claim 14 wherein transmitting the first data stream of the first subset further comprises
   determining the at least one subscriber, the at least one subscriber having an interest in the first data stream.

16. The method of claim 14 wherein determining the at least one subscriber is based on geographic location of the subscriber with respect to the area.

17. The method of claim 14 wherein the first data stream of the first subset that is transmitted further includes overlay content associated with a service provider.

18. An apparatus for streaming data to service subscribers, the apparatus comprising:
   a processor configured to receive a plurality of contemporaneous data streams from a plurality of mobile stations in a communication network, each respective contemporaneous data stream including a tag, the tag having a tag value indicating a subject of the respective contemporaneous data stream, a significance of the respective contemporaneous data stream, a type of event for the respective contemporaneous data stream, a person of interest associated with the respective contemporaneous data stream or a combination thereof;
   wherein the processor is configured to determine a first subset of the plurality of contemporaneous data streams, the first subset originating from an area determined based on an originating location of the respective contemporaneous data stream, coordinates of the respective contemporaneous data stream, or a communication cell associated with the respective contemporaneous data stream, the first subset of contemporaneous data streams having a same tag value;
   and wherein the processor is configured to transmit a first data stream of the first subset.

19. A computer readable medium having stored thereon instructions comprising machine executable code which when executed by at least one processor, causes the processor to
   receive a plurality of contemporaneous data streams from a plurality of mobile stations in a communication network, each respective contemporaneous data stream including a tag, the tag having a tag value indicating a subject of the respective contemporaneous data stream, a significance of the respective contemporaneous data stream, a type of event for the respective contemporaneous data stream, a person of interest associated with the respective contemporaneous data stream or a combination thereof;
   determine a first subset of the plurality of contemporaneous data streams, the first subset originating from an area determined based on an originating location of the respective contemporaneous data stream, coordinates of the respective contemporaneous data stream, or a communication cell associated with the respective contemporaneous data stream, the first subset of contemporaneous data streams having a same tag value; and
transmit a first data stream of the first subset.

* * * * *